(12) United States Patent
Wang et al.

(10) Patent No.: US 7,494,287 B2
(45) Date of Patent: Feb. 24, 2009

(54) INTEGRATED OPTICAL FIBER AND ELECTRO-OPTICAL CONVERTER

(75) Inventors: Xiaozhong Wang, Sunnyvale, CA (US); Albert T. Yuen, Palo Alto, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/854,319

(22) Filed: Sep. 12, 2007

(65) Prior Publication Data

US 2008/0050123 A1 Feb. 28, 2008

Related U.S. Application Data

(62) Division of application No. 10/965,984, filed on Oct. 15, 2004.

(51) Int. Cl.
*G02B 6/36* (2006.01)
(52) U.S. Cl. .............................. 385/92; 385/88; 385/89
(58) Field of Classification Search ............. 385/88–92; 439/577
See application file for complete search history.

(56) References Cited

U.S. PATENT DOCUMENTS

| | | | |
|---|---|---|---|
| 4,767,168 A | 8/1988 | Grandy | |
| 5,066,097 A | 11/1991 | Brandle et al. | |
| 5,221,984 A * | 6/1993 | Furuyama et al. | ............ 398/161 |
| 5,242,315 A | 9/1993 | O'Dea | |
| 5,448,661 A | 9/1995 | Takai et al. | |
| 6,583,902 B1 | 6/2003 | Yuen | |
| 6,685,501 B1 * | 2/2004 | Wu et al. | ..................... 439/497 |
| 6,974,262 B1 | 12/2005 | Rickenbach | |
| 2005/0089281 A1 * | 4/2005 | Chiu et al. | ..................... 385/92 |
| 2005/0117913 A1 * | 6/2005 | Hung et al. | .................. 398/139 |
| 2006/0088251 A1 | 4/2006 | Wang et al. | |

OTHER PUBLICATIONS

Blazar LUX5010 Multirate 4x10G Optical Active Cable; Luxtera (pp. 1-4).
Aspects of the InfiniBand Architecture, Computer Society, Gregory F. Psister, 3 pgs.

* cited by examiner

*Primary Examiner*—Michelle R Connelly Cushwa
*Assistant Examiner*—Rhonda S Peace

(57) ABSTRACT

A fiber optic communications cable for providing a short range, high speed data communications link between information system units, including an optical fiber with an integral housing at each end having an electrical connector extending from the housing and adapted to mate with a corresponding electrical connector on an external information system unit for transferring an information signal between the cable and the unit. A signal converter in the integral housing's converts the information signal between an electrical signal and a corresponding optical signal.

30 Claims, 6 Drawing Sheets

INTEGRATED OPTICAL FIBER AND ELECTRO-OPTICAL CONVERTER

The present application is related to U.S. application Ser. No. 10/612,886 filed on Jul. 3, 2003, entitled "Modular Media Converter", the contents of which are incorporated herein by reference in its entirety.

FIELD OF THE INVENTION

The present invention relates to high speed data communications cables, and more particularly to optical fiber cables and electro-optical signal converters used for short-range coupling of information system units.

BACKGROUND OF THE INVENTION

High speed data communications networks utilize optical fiber cables for data transmission between information system units such as computers, mass data storage devices, and routers. Such units typically employ electrical connectors which couple to electrical connectors associated with electrical cables. To couple such units to an optical fiber cable, an electro-optical converter or transceiver is employed which interfaces between the electrical connector and the optical fiber cable.

Examples of electrical connectors know in the prior art communications applications are illustrated in FIGS. 1A and 1B. More particularly, FIG. 1A shows an electrical connector 10 designed for use in a 4-channel InfiniBand™ electrical interconnect. FIG. 1B shows an electrical connector plug 12 designed for use in a 12-channel InfiniBand™ electrical interconnect. Electrical connectors 10 and 12 are inserted in associated electrical receptacles mounted on an information systems unit to establish electrical contact with the input/output terminals of such unit.

FIGS. 2A and 2B respectively show an optical cable connector 14 and an optical cable connector receptacle 16 used in InfiniBand™ 4-channel and 12-channel optical interconnects. The optical connector 14 is adapted to mate with optical connector receptacle 16 to enable the four independent optical signals traveling through four fibers in the attached optical cable 18 to communicate with corresponding receivers disposed in the optical connector receptacle 16. The committee setting standards for both 10 Giga-bit Fiber Channel (10 GFC) and 10 Giga-bit Ethernet (10 GbE) is considering to use the above described electrical and optical connector plugs/receptacles in systems complying with these standards.

FIG. 3 shows a conventional InfiniBand™ interface card 20 that is adapted to be inserted in system 22. Depending on the function it is adapted to perform, the InfiniBand™ interface card 20 is commonly referred to as a Host-Channel Adapter (HCA) or a Target Channel Adapter (TCA). Each InfiniBand™ interface card 20 includes one or more printed circuit boards (PCB) that are alternatively referred to hereinbelow as host broads. Each such PCB typically includes hardware adapted to establish communication with other PCBs, with other interface cards or modules via a multitude of electrical wires or optical cables.

FIG. 4A shows an electrical connector receptacle 24 mounted on a host board 26 of a TCA/HCA card. Electrical connector receptacle 24 is adapted so as to mate with electrical connector plug 10 (also see FIG. 1A). FIG. 4B shows an optical connector receptacle 28 mounted on a host board 30 of a TCA/HCA card. Optical connector receptacle 28 is adapted so as to mate with optical connector plug 14 (also see FIG. 2A).

In conventional systems, the host board is often adapted to mate with either an electrical connector plug or an optical connector plug. If the host board is adapted to mate with an electrical connector plug and a subsequent need arises to carry the signals over distances longer than those for which electrical wires, i.e., copper may be used (InfiniBand™ specification calls for copper wire to be used for distances up to 17 meters), the user may need to replace the TCA/HCA card with a card adapted to receive an optical cable so as to be able to handle optical signals, thereby increasing cost. Similarly, if the host board card is adapted to mate with an optical connector plug, and a subsequent need arises to carry the signals over a relatively shorter distances, it may be more cost effective to replace the TCA/HCA card with a card adapted to receive a copper wire so as to be able to handle electrical signals.

Accordingly, media adapters have been developed to enable optical signals carried via an optical cable to be coupled to electrical receptacles. Such media adapters include a fiber optic cable with an electrical plug coupled to on one end and an optical plug coupled to another end. The electrical plug is adapted to mate with an electrical connector receptacle on a host board and the optical plug is adapted to mate with an optical connector receptacle. The electrical signals present on the electrical receptacle are converted to optical signals by a transceiver disposed in the media adapter and carried over fiber optic cable. Conventional media adapters are connectorized and are thus relatively expensive. Furthermore, safety issues remain a concern if a user detaches the optical cable from the coupling plugs and looks at the light beams emanating from the lasers disposed therein.

BRIEF SUMMARY OF THE INVENTION

Briefly, and in general terms, the present invention provides a communications cable for providing a short range, high speed data communications link between information system units including an optical fiber with an integral housing at each end having an electrical connector extending from the housing and adapted to mate with a corresponding electrical connector on an external information system unit for transferring an information signal between the cable and the unit; and a signal converter in the integral housing connected to the electrical connector for converting an information signal between an electrical signal and a corresponding optical signal. In accordance with one embodiment of the present invention, a cable assembly includes a fiber optic cable with a pair of optical connector plugs coupled to each one of its ends. The optical connector plugs are adapted to mate with two electrical connector receptacles already present on two host boards. The cable assembly thus enables communication between the electrical receptacles of the two host boards to be carried out via optical signals. In other words, the cable assembly is adapted to receive electrical signals from a first electrical receptacle—mounted on the first host board—via one of its optical connector plugs, and subsequently convert the received electrical signals to optical signals and deliver the optical signals via the fiber optic cable to the other optical connector plug. The receiving optical connector plug converts the optical signals to electrical signals and delivers the converted electrical signal to the second electrical connector receptacle mounted on the second host board.

The electrical connector receptacle has physical and electrical characteristics defined by the same standard as that defining the physical and electrical characteristic of the optical plugs. Accordingly, the same electrical receptacle on the host board may be used to receive both an electrical connector plug or the optical connector plug of the cable assembly.

Accordingly, if the distance between the two electrical connector receptacles (i.e., the two host boards) is, e.g., more than 15 meters, a cable assembly, in accordance with the present invention, may be used to establish communication between the two host boards. If, on the other hand, the distance between the two host boards is, e.g., less than 15 meters, a conventional copper cable with standard electrical connector plugs may be used to establish communication between the two host boards.

Each optical plug includes, in part, an optical engine mounted on a board, a top housing shell, and a bottom housing shell. In some embodiments, the fiber optic cable is attached to the optical plugs via a strain relief boot. Because the fiber optic cable is attached to the optical plugs and may not be easily removed, the user is not exposed to safety hazards that may result from viewing the laser beams. In other embodiments, the fiber optic cable is glued to the optical plugs.

In accordance with another embodiment of the present invention, a cable assembly includes, in part, a connector plug from which a fiber optic cable and an electrical cable are fanned out. The connector plug receives and processes (e.g., amplify, filter, etc.) electrical signals from an electrical connector receptacle mounted on a host board. The processed signals that are to be transmitted via the fiber optic cable are converted to optical signals using an optical engine. The processed signals that are to be transmitted via the electrical cable may be further processed before being transmitted. In some embodiments, the signals transmitted by the fiber optic cable may be the same as those transmitted by the electrical cable and may include the entire set of the signals received from the connector receptacle. In yet other embodiments, the signals transmitted by the fiber optic cable may be different from those transmitted by the electrical cable.

In some embodiments of the present invention, the optical engines as well as the integrated circuits are powered by circuitry disposed on the host boards via the same supply voltages which power the components on the host boards. One or more of the connectors of the electrical receptacles are configured to deliver the supply voltages to the optical engines as well as the integrated circuits mounted on one or more boards disposed within the connector plug and configured to process the received electrical signals.

DETAILED DESCRIPTION OF THE INVENTION

In accordance with one embodiment of the present invention, a cable assembly includes a fiber optic cable with a pair of optical connector plugs coupled to each one of its ends. The optical connector plugs are adapted to mate with two electrical connector receptacles already present on two host boards. The cable assembly thus enables communication between the electrical receptacles of the two host boards to be carried out via optical signals. In other words, the cable assembly is adapted to receive electrical signals from a first electrical receptacle—mounted on the first host board—via one of its optical connector plugs, and subsequently convert the received electrical signals to optical signals and deliver the optical signals via the fiber optic cable to the other optical connector plug. The receiving connector plug converts the optical signals to electrical signals and delivers the converted electrical signal to the second electrical connector receptacle mounted on the second host board.

The electrical connector receptacle has physical and electrical characteristics defined by the same standard as that defining the physical and electrical characteristic of the optical plugs. Accordingly, the same electrical receptacle on the host board may be used to receive both an electrical connector plug or the optical connector plug of the cable assembly. Accordingly, if the distance between the two electrical connector receptacles (i.e., the two host boards) is, e.g., more than 15 meters, a cable assembly, in accordance with the present invention, may be used to establish communication between the two host boards. If, on the other hand, the distance between the two host boards is, e.g., less than 15 meters, a conventional copper cable with standard electrical connector plugs may be used to establish communication between the two host boards.

Figure 5:
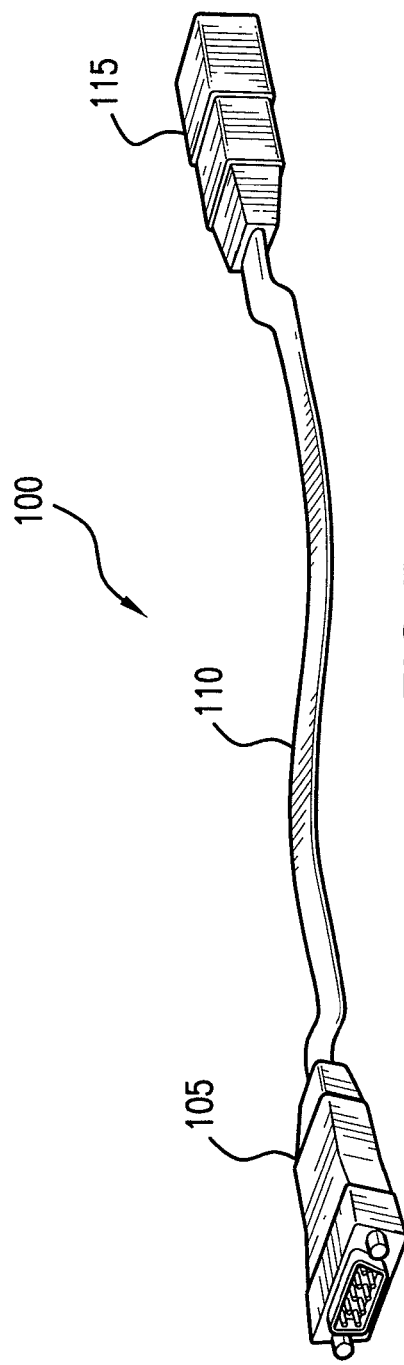
FIG. 5 shows a cable assembly, in accordance with a first embodiment of the present invention.

FIG. 5 shows a cable assembly 100, in accordance with one embodiment of the present invention. Cable assembly 100 includes, in part, a fiber optic cable 110, a first optical connector plug 105 coupled to a first end of fiber optic cable 110, and a second optical connector plug 115 coupled to a second end of fiber optic cable 110. Each of the optical connector plugs (hereinafter alternatively referred to as optical plug) 105, and 115, is adapted to mate with a different electrical connector receptacle mounted on a host board, such as electrical receptacle 104 of host board 106, shown in FIG. 6.

Figure 1A:
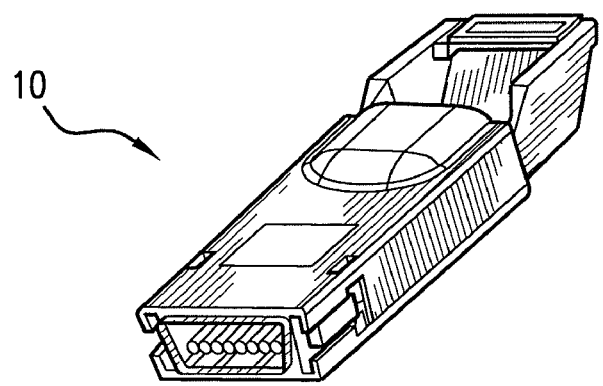
FIG. 1A shows an electrical connector plug adapted for use in a 4-channel InfiniBand™ electrical interconnects, as known in the prior art.
Figure 1B:
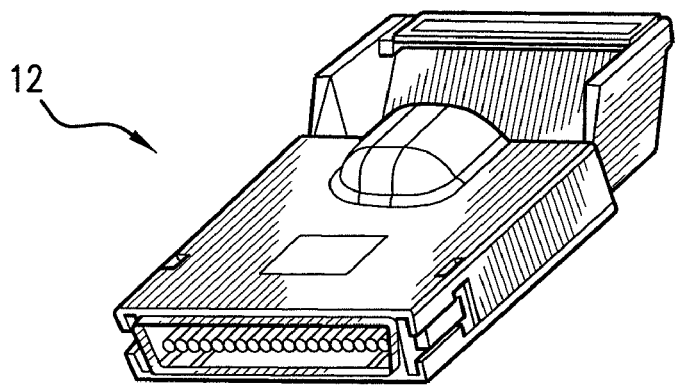
FIG. 1B shows an electrical connector plug adapted for use in a 12-channel InfiniBand™ electrical interconnects, as known in the prior art.
Figure 2A:
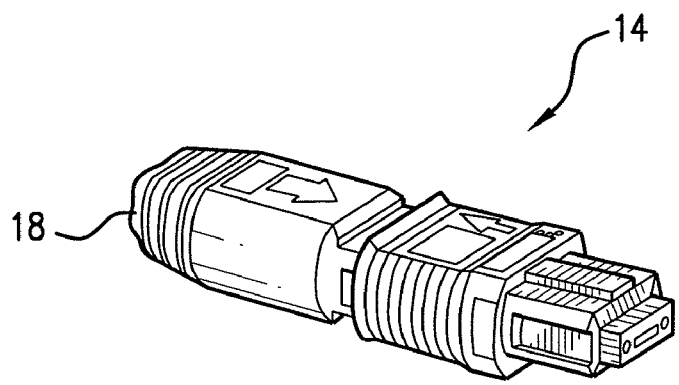
FIG. 2A shows an optical connector plug used in InfiniBand™ interconnects, as known in the prior art.
Figure 2B:
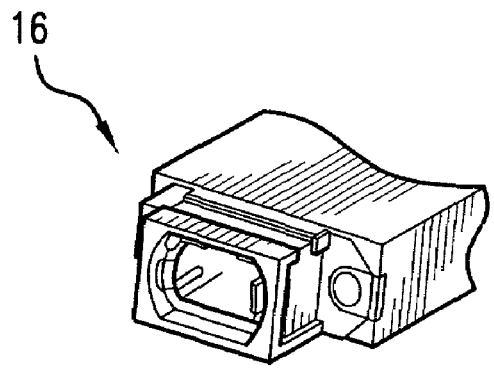
FIG. 2B shows an optical connector receptacle used in InfiniBand™ interconnects, as known in the prior art.
Figure 3:
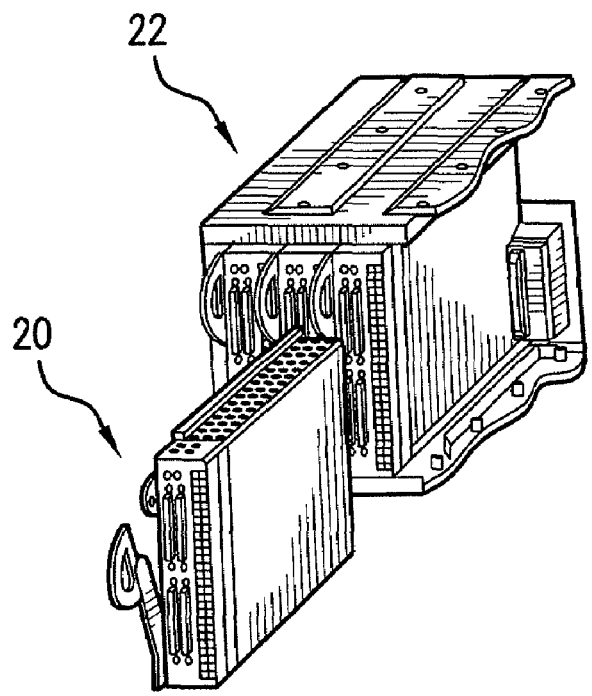
FIG. 3 shows a conventional InfiniBand™ interface card.
Figure 4A:
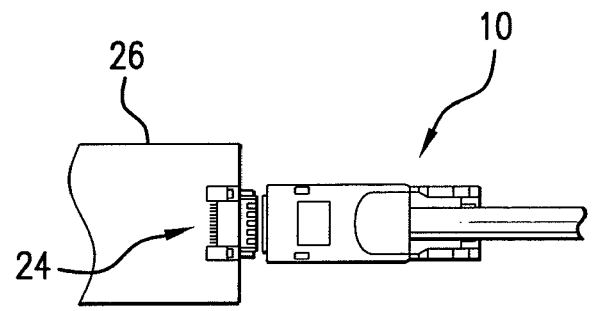
FIG. 4A shows an electrical connector receptacle mounted on a host board, and an electrical connector plug adapted to mate therewith.
Figure 4B:
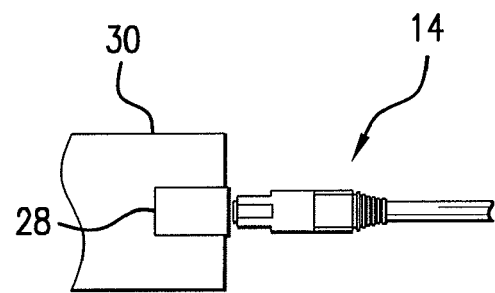
FIG. 4B shows an optical connector receptacle mounted on a host board, and an optical connector plug adapted to mate therewith.
Figure 6:
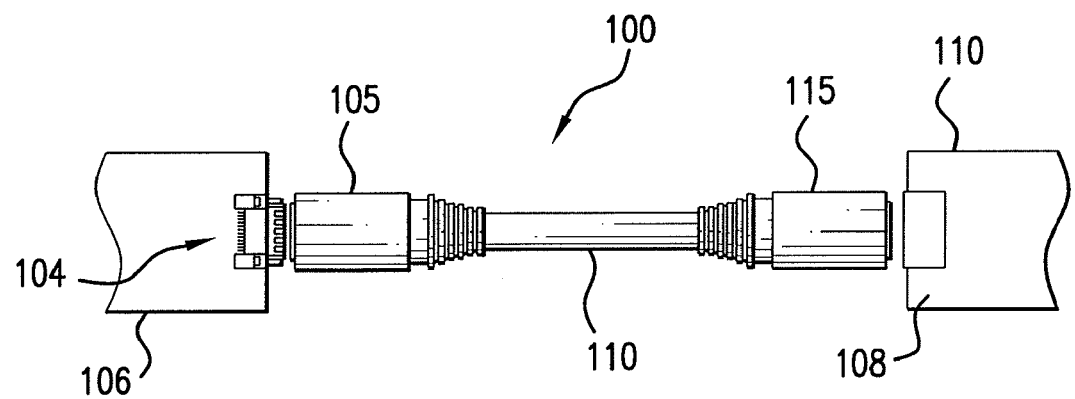
FIG. 6 shows the cable assembly of FIG. 5 positioned to establish communications between a pair of electrical connector receptacles mounted on two different host boards.

In FIG. 6 cable assembly 100 is shown as being in alignment with electrical receptacle 104—mounted on host board 106—and electrical receptacle 108 that is mounted on electrical host board 110. If the distance d between host board 106 and 110 is less than the maximum recommended distance for which copper cable is adapted to be used, a copper cable (not shown), such as Category 5 cable, may be used to connect electrical receptacle 104 with electrical receptacle 108 in order to establish communication between these two electrical receptacles. If, on the other hand, distance d between host board 106 and 110 is greater than the maximum recommended distance for which copper cable is adapted to be used, connector plug 105 is mated directly with electrical receptacle 104 and connector plug 115 is mated directly with electrical receptacle 108 in order to establish communication between these two electrical receptacles.

Disposed within each plug 105 and 115 of cable assembly 100 is an electrical/optical engine (hereinafter alternatively referred to as optical engine) adapted to convert electrical signals to optical signals and vice versa. As known to those skilled in the art, each optical engine includes components such as, lasers, lenses, laser drivers, etc. The optical engine in each optical plug, e.g. optical plug 105, is adapted to receive electrical signals from its mating electrical receptacle, e.g., electrical receptacle 104, convert that electrical signal to optical signal, and thereafter deliver that optical signal via fiber optic cable 110 to the other optical plug, e.g., optical plug 115. The optical plug 115 receiving the optical signal converts the received optical signal to electrical signal and delivers the converted electrical signal to, e.g., electrical receptacle 108.

Figure 7:
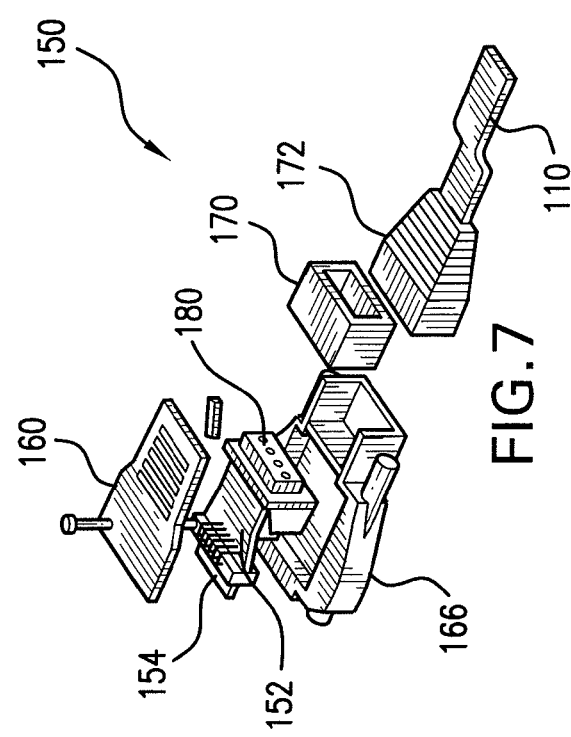
FIG. 7 is an exploded view of one exemplary embodiment of the optical connector plug of the cable assembly of FIG. 5.

FIG. 7 is an exploded view of one exemplary embodiment 150 of each of optical plugs 105, 110. Optical plug 150 is shown as including, in part, an optical engine 180 mounted on board 152, top housing shell 160, bottom housing shell 166 sleeve 170, and strain relief boot 172. The optical engine 150 is mounted and secured to board 152. Thereafter, the board 152 is disposed between top and bottom housing members 160 and 166. It is understood that board 152 may be a flexible circuit board or a rigid circuit board. In the embodiment 150, the optical engine 180 is an optical transceiver, however, in other embodiments, the optical engine 180 may be an optical transmitter or an optical receiver. A train relief boot 172 is adapted to prevent fiber optic cable 110 from being detached from optical plug 150. Since fiber optic cable 110 is attached to optical plug 150 and may not be easily removed, the user is not exposed to safety hazards that may result from viewing the laser beams present therein.

Optical plug 150 complies with the same industry standard with which host board 106 and electrical receptacle 104 also comply. For example, if host board 106 and electrical receptacle 104 are formed in accordance with InfiniBand™ specifications, optical plug 150 is also compliant with Infini-Band™ specifications. If host board 106 and electrical receptacle 104 are formed so as to comply with Host-Channel Adapter (HCA) or a Target Channel Adapter (TCA) specifications and standards, optical plug 150 is also compliant with these specifications and standards. Therefore, board 152 is formed so as to receive any standard compliant optical engine.

Figure 8:
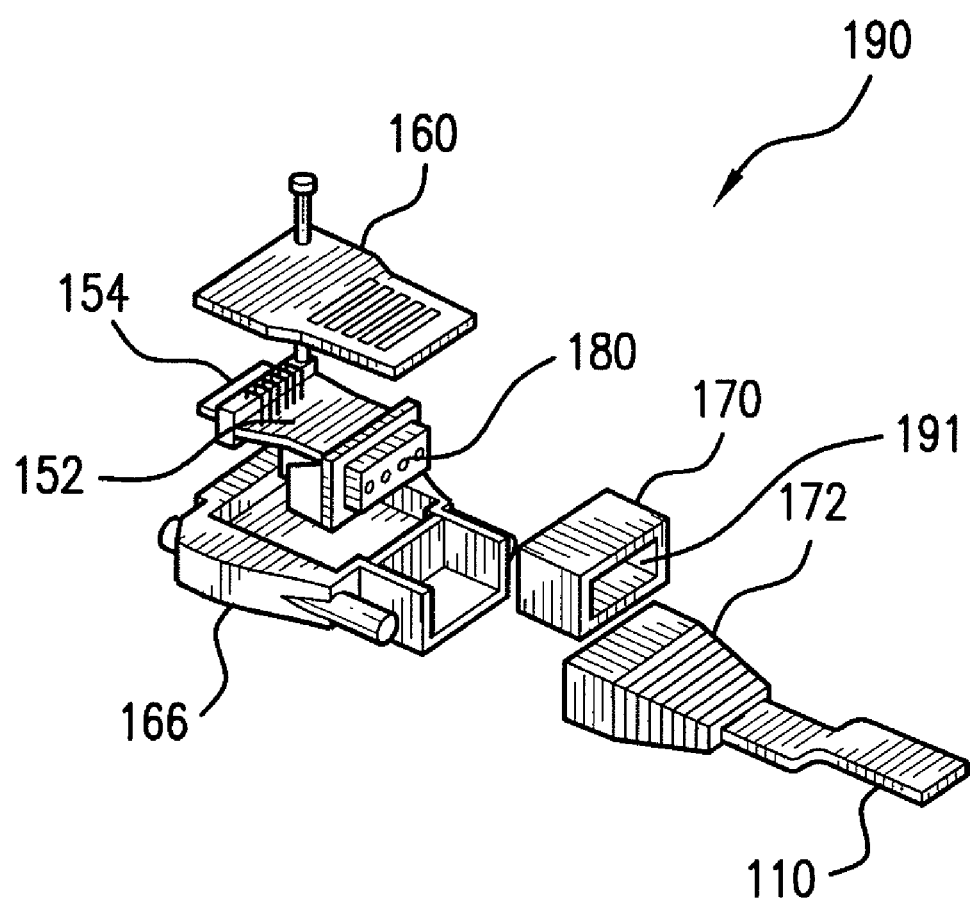
FIG. 8 is an exploded view of another exemplary embodiment of the optical connector plug of the cable assembly of FIG. 5.

FIG. 8 is an exploded view of another exemplary embodiment 190 of each of optical plugs 105, 110. Optical plug 190 is shown as including, in part, an optical engine 180 mounted on board 152, top housing shell 160, bottom housing shell 166, and sleeve 170. In accordance with this embodiment, fiber optic cable 110 is affixed to optical plug 190 via glue 191, or other adhesive, so as not to be easily removed. The user is therefore not exposed to safety hazards that may result from viewing the laser beams. The glue used in accordance with this embodiment, is adapted to maintain its properties under a wide range of temperatures and is available from a number of vendors, such as 3M Co, located at 3M Center, St. Paul, Minn., 55144, USA.

As described above, cable assembly 100 dispenses the need for replacing electrical receptacle 104 or host board 106 in the field if a decision is made to use an optical fiber in place of copper wires as the transmission medium. As described above, optical engine 180 may be supplied or manufactured by any commercial vendor or manufacturer so long as it complies with the same standard as that with which host board 106 or electrical receptacle 104 are also adapted to comply.

Because fiber optic cable 110 is not connectorized (i.e., fiber optic cable 110 may not be detached from the optical plugs) it provides a relatively high level of eye safety. Furthermore, because fiber optic cable 110 is not connectorized, it has improved matched ends properties, as described further below. In a conventional connectorized optical cable, a first optical engine coupled to a first end of the optical cable is required to operate with any optical engine coupled to the other end of the optical cable, notwithstanding their respective manufactures. Therefore, the first optical engine is required to function over a wide range of operating conditions, resulting in yield loss and a relatively more extensive testing. In contrast, because the two optical engines disposed at the two ends of cable assembly 100, are only required to operate with each other, they are easier two match; in other words, cable assembly 100 has matched ends. Moreover, in accordance with the present invention, because the two optical engines are matched, a higher manufacturing yield is achieved and less extensive testing of the optical engines are required.

In the embodiment shown in FIGS. 7-8, optical engine 180 is mounted to board 152 via a fastener, such as a screw or bolt. In other embodiments, optical engine 180 may be, for example, soldered to board 152. In some embodiment, optical engine 180 may have four-channels. In yet other embodiments, optical engine 180 may have, e.g., twelve channels.

Figure 9:
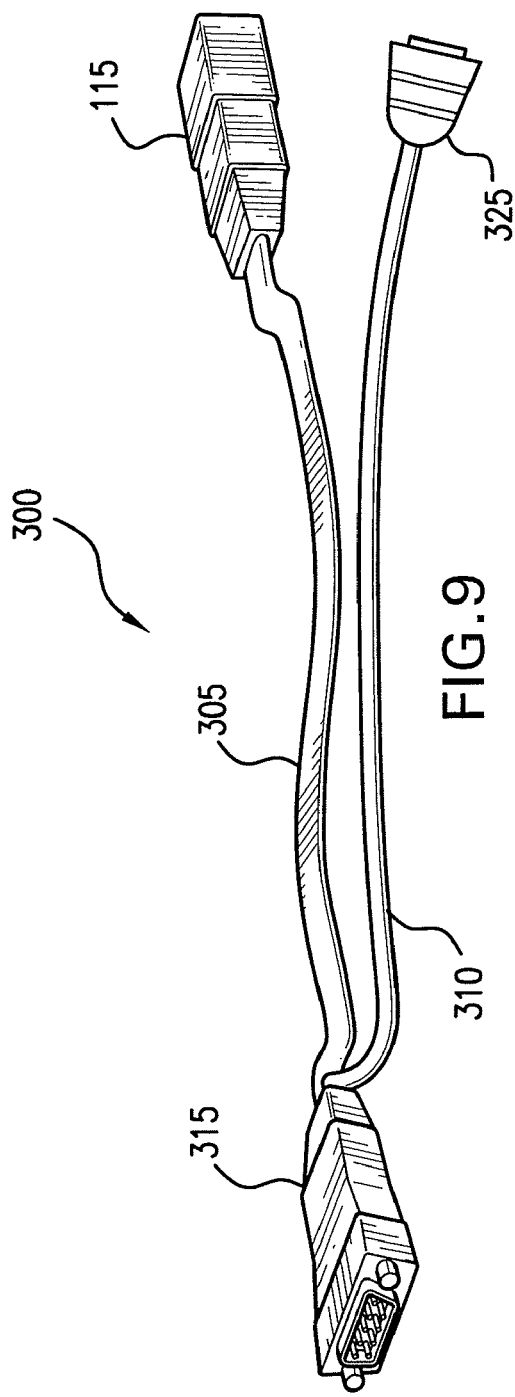
FIG. 9 shows a cable assembly having a connector plug from which a fiber optic cable and an electrical cable are fanned out, in accordance with a second embodiment of the present invention.

FIG. 9 shows a cable assembly 300 in accordance with another embodiment of the present invention. Cable assembly 300 includes, in part, one or more fiber optic cables 305 adapted to carry optical signals, one or more electrical cables (e.g., copper wire) 310 adapted to carry electrical signals 310, first connector plug 315 coupled to a first end of fiber optic cable 305 and electrical cable 310, a second optical connector plug 115 coupled to a second end of fiber optic cable 305, and a third electrical connector plug 325 coupled to a second end of electrical cable 310.

Connector plug 315 is adapted to mate with an electrical connector receptacle mounted on a host board, such as electrical receptacle 104 of host board 106, shown in FIG. 6. Connector plug 315 is also adapted to receive and process (e.g., amplify, filter, etc.) electrical signals and deliver a subset or the whole set of the processed electrical signals to electrical cable 310. Connector plug 315 is further adapted to deliver a subset or the whole set of the processed electrical signals to fiber optic cable 305, as described further below.

Figure 10:
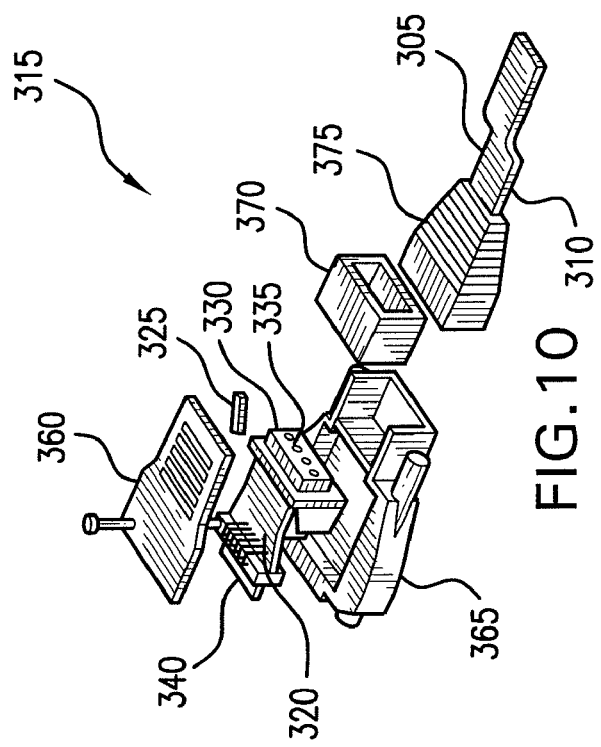
FIG. 10 is an exploded view of one exemplary embodiment of the connector plug of FIG. 9 from which the fiber optic cable and electrical cable are fanned.

FIG. 10 is an exploded view of one exemplary embodiment of connector plug 315. Connector plug 315 is shown as including, a board 320 which may be a flexible board or a rigid board, an electrical connector array 340, integrated circuits 325 and 330 and optical engine 335 mounted on board 320, top housing shell 360, bottom housing shell 365, and strain relief boot 375. In the embodiment shown in FIG. 10, integrated circuit 330 as well as optical engine 335 are mounted on a front side of board 320 which is different from the side on which integrated circuit 325 is mounted. It is understood that in other embodiments, the positions on which these components are mounted may be different from those shown in FIG. 10. As seen from FIG. 10, board 152 is disposed between top and bottom housing shells 360 and 365.

Integrated circuit 325 processes the electrical signals it receives from connector array 340 and delivers the processed signals to one or both of integrated circuit 330 and optical engine 335. In some embodiments, the processing functions performed by integrated circuit 325 may include, for example, amplification, filtering, etc. In some embodiments, optical engine 335 is an optical transceiver, however, in other embodiments, optical engine 335 may be an optical transmitter or an optical receiver.

Integrated circuit 325 is adapted so as to process the electrical signals it receives from connector array 340 to determine whether these signals are to be delivered to electrical cable 310 or to fiber optic cable 305 or both. Integrated circuit 325 delivers the signals that are to be carried by electrical cable 310 to integrated circuit 330. Similarly, integrated circuit 325 delivers the signals that are to be carried by fiber optic cable 310 to optical engine 335. Integrated circuit 330 may perform additional processing of the signals it receives (e.g., amplify) before delivering these signals to the electrical wires disposed in electrical cable 310. In some embodiment, integrated circuit 325 delivers the processed electrical signals to electrical cable 310 without sending these signals to integrated circuit 330. Optical engine 335 converts the electrical signals it receives from integrated circuit 325 to optical signals and delivers the optical signals to fiber optic cable 305.

Accordingly, electrical cable 310 and fiber optic cable 305 may respectively carry electrical and optical signal concurrently. Furthermore, if the distance between the two electrical connector receptacles (i.e., the two host boards) is, e.g., more than 15 meters, the signals are carried by fiber optic cable 305, in accordance with the present invention, to establish communication between the two host boards. If, on the other hand, the distance between the two host boards is, e.g., less than 15 meters, the signals are carried by electrical cable 310, e.g., conventional copper cable, to establish communication between the two host boards. In some embodiments, fiber optic cable 305 and electrical cable 310 may carry the same information. In yet other embodiments, fiber optic cable 305 and electrical cable 310 may carry different information. Integrated circuits 325 and 335 as well as optical engine 335 may be powered by the media detection circuitry.

Strain relief boot 172 is adapted to prevent fiber optic cable 110 from being detached from optical plug 150. Because fiber optic cable 110 is attached to optical plug 150 and may not be easily removed, the user is not exposed to safety hazards that may result from viewing the laser beams present therein.

It is understood that the above embodiments of the present invention are illustrative and not limitative. For example, the invention in not limited by the type of optical engine disposed in the optical plug of each end of the assembly cable. The invention is not limited by the type of circuit board, flexible or rigid, on which the optical engine is mounted. The invention is not limited by the number of channels, speed or specific electrical or optical configuration that, e.g., the optical engine is adapted to handle. Other variations, modifications, additions, deletions are obvious in light of the above disclosure and are intended to fall within the scope of the appended claims.

What is claimed is:

1. A communications cable for providing a short range, high speed data communications link between information system units comprising:

an integral housing with a top housing shell and a bottom housing shell, said integral housing including an electrical connector plug extending from the housing, said connector having a plurality of terminals with at least some terminals assigned to each of a plurality of communication channels, where the sets of terminals of the communication channels are noncoincident and where the electrical connector is adapted to detachably mate with a corresponding electrical receptacle on an external information system unit for transferring an information signal on each of the plurality of channels between the cable and the unit;

a circuit board disposed between the top and bottom housing shells;

a multi-channel signal converter having a plurality of channels, each with a respective optical transmitter and optical receiver disposed on the circuit board and wherein each channel of the plurality of channels of the signal converter is connected to a respective channel of the electrical connector for converting the information signal on each of the plurality of channels between an electrical signal and a corresponding optical signal; and an optical fiber cable with a first end integrated into said signal converter and extending from the housing for transmitting information signals over a distance between the external unit and a first remote information system unit.

2. A communications cable as defined in claim 1, wherein the electrical connector is an Infiniband connector.

3. A communications cable as defined in claim 1, further comprising a plurality of lasers and laser drivers.

4. A communication cable as defined in claim 1 wherein said optical fiber cable further comprises a single cable extending between the housing and remote unit.

5. A communication cable as defined in claim 4 wherein said optical fiber cable further comprises a single optical fiber that forms the sole connection between the housing and remote unit.

6. A communications cable for providing a short range, high speed data communications link between information system units comprising:

a plug disposed on a first end of the communication cable having a top housing shell and a bottom housing shell;

a circuit board disposed between the top and bottom housing shells;

an electrical connector plug disposed on the circuit board, said electrical connector extending from the housing and adapted to detachably mate with a corresponding electrical connector receptacle on an external information system unit for transferring a plurality of information signals between the cable and the unit through a plurality of respective terminals of the electrical connector and to allow the cable to be connected or disconnected from the system unit;

a multi-channel signal processor disposed on the circuit board and connected to the electrical connector, said multi-channel signal processor having a plurality of channels, each coupled to the respective terminals of an information signal of the plurality of information signals, said multi-channel signal processor processing and converting an information signal on each of the plurality of channels of the signal processor between an electrical signal and a corresponding optical signal coupled to an optical fiber cable, said optical fiber cable being coupled to and integrated into said multi-channel signal converter and extending from the housing for transmitting the plurality of information signals over a distance between the external unit and a first remote information system unit.

7. The communications cable as defined in claim 6, wherein the electrical connector is an Infiniband connector.

8. The communications cable as defined in claim 6, further comprising a plurality of lasers and laser drivers.

9. A communication cable as defined in claim 6 wherein said optical fiber cable further comprises a single cable extending between the plug and remote unit.

10. A communication cable as defined in claim 9 wherein said optical fiber cable further comprises a single optical fiber that forms the sole connection between the plug and remote unit.

11. A communications cable for providing a short range, high speed data communications link between information system units comprising:
a single termination cable plug disposed on a first end of the communication cable, the plug having a top housing shell and a bottom housing shell;
a circuit board disposed between the top and bottom housing shells, said circuit board having a plurality of integrated circuits including a multi-channel signal converter with a plurality of channels disposed on the circuit board for processing and converting an information signal on each of the plurality of channels between an electrical signal and a corresponding optical signal;
an electrical connector plug coupled to the circuit board having a plurality of terminals, said electrical connector disposed in and extending from the housing and adapted to mate with a corresponding electrical connector on an external information system unit for transferring the plurality of information signals of the respective channels of the multi-channel signal converter between the cable and the unit through respective terminals of the plurality of terminals; and
an optical fiber cable with a first end coupled to and integrated into the circuit board and extending from the housing for transmitting the plurality of information signals over a distance between the external unit and a first remote information system unit.

12. The communications cable as defined in claim 11, wherein the electrical connector is an Infiniband connector.

13. The communications cable as defined in claim 11, further comprising a plurality of lasers and laser drivers.

14. A communication cable as defined in claim 11 wherein the circuit board simultaneously transmits and receives at least four bits of differential data.

15. A communication cable as defined in claim 11 wherein said optical fiber cable further comprises a single cable extending between the plug and remote unit.

16. A communication cable as defined in claim 15 wherein said optical fiber cable further comprises a single optical fiber that forms the sole connection between the plug and remote unit.

17. A communications cable for providing a short range, high speed data communications link between information system units comprising:
an integral housing including
an electrical connector plug extending from the housing and adapted to mate with a corresponding electrical connector on an external information system unit for transferring a plurality of information signals through respective terminals of the electrical connector between the cable and the unit;
a multi-channel signal converter that simultaneously transmits and receives at least four bits of differential data, said multi-channel signal converter connected to the electrical connector, said multi-channel signal converter having a plurality of channels, each with a respective optical transmitter and optical receiver and each coupled to the respective terminals of an information signal of the plurality of information signals, said multi-channel signal converter processing and converting an information signal between an electrical signal and a corresponding optical signal; and
an optical fiber cable directly coupled to and integrated into said signal converter and extending from the housing for transmitting the plurality of information signals over a distance between the external unit and a first remote information system unit.

18. A communications cable as defined in claim 17, wherein the electrical connector is an Infiniband connector.

19. A communications cable as defined in claim 17, further comprising a plurality of lasers and laser drivers.

20. A communication cable as defined in claim 17 wherein said optical fiber cable further comprises a single cable extending between the housing and remote unit.

21. A communication cable as defined in claim 20 wherein said optical fiber cable further comprises a single optical fiber that forms the sole connection between the housing and remote unit.

22. A communications cable for providing a short range, high speed data communications link between information system units comprising:
an optical fiber cable;
an electrical connector plug disposed on each of the opposing ends of the optical fiber cable for electrically connecting to a respective external device, each connector having a plurality of terminals with at least some terminals assigned to each of a plurality of communication channels, where the sets of terminals of the communication channels are noncoincident;
a multi-channel electro/optical converter that simultaneously transmits and receives at least four bits of differential data, said multi-channel electro/optical converter having a plurality of channels, each with a respective optical transmitter and optical receiver disposed within each of the electrical connectors wherein each channel of the plurality of channels of the optical converter is connected to a respective communication channel of the electrical connector, where the multi-channel signal converter processes and converts between an information signal within the optical fiber cable and a corresponding electrical signal of the respective communication channels of the electrical connector, wherein the electro/optical converter receives electrical power for processing the information signal through the electrical connector from an external device when connected thereto.

23. A communication cable as defined in claim 22 wherein said optical fiber cable further comprises a single cable extending between the housing and remote unit.

24. A communication cable as defined in claim 23 wherein said optical fiber cable further comprises a single optical fiber that forms the sole connection between the housing and remote unit.

25. A high speed communication cable for providing a short range, high speed data communications link between information system units comprising:
an optical fiber cable;
a first optical connector plug integral to the fiber cable on a first end of the fiber cable including a housing with an electrical connector plug for coupling with a first information system device and for transmitting a plurality of information-containing electrical signals over respective terminals of said first connector plug;
a multi-channel electro/optical conversion means that simultaneously transmits and receives at least four bits of differential data, said conversion means having a plurality of channels, each with a respective optical transmitter and optical receiver disposed inside the housing of said first connector plug, each channel of the multi-channel electro/optical conversion means coupled to the respective terminals of an information containing electrical signal of the plurality of information-containing electrical signals for processing and converting between the electrical signal and a modulated optical signal corresponding to the electrical signal, and coupling the optical signal to or from said optical fiber cable;

a second optical connector plug integral to the fiber cable on a second end of the fiber cable including a housing with an electrical connector plug for coupling with a second information system device and for transmitting the plurality of information-containing electrical signals over respective terminals of said second connector plug; and a multi-channel electro/optical conversion means having a plurality of channels, each with a respective optical transmitter and optical receiver disposed inside the housing of said second connector plug, each channel of the multi-channel electro/optical conversion means coupled to the respective terminals of an information containing electrical signal of the plurality of information-containing electrical signals for converting between the electrical signal of the information containing electrical signals and a modulated optical signal corresponding to the electrical signal, and coupling the optical signal to or from said optical fiber cable.

26. A communication cable as defined in claim 25 wherein said optical fiber cable further comprises a single cable extending between the housing and remote unit.

27. A communication cable as defined in claim 26 wherein said optical fiber cable further comprises a single optical fiber that forms the sole connection between the housing and remote unit.

28. A communications cable for providing a short range, high speed data communications link between information system units comprising:

an optical fiber cable;

a housing disposed on each of the opposing ends of the optical fiber cable, each of said housings including (i) an electrical connector plug for electrically connecting to a respective external device; and (ii) an multi-channel electro/optical converter that simultaneously transmits and receives data over a plurality of channels, said multi-channel electro-optical converter having an electro/optic converter for each channel of the multi-channel electro/optical converter with each opposing end of the optical fiber cable secured to and integrated into the respective multi-channel electro-optical converter, each electro/optical converter of said multi-channel electro/optical converters having an optical transmitter and an optical receiver for transmitting or receiving an optical signal to or from the optical fiber cable and processing and converting between a multi-channel information signal within the optical fiber cable and a corresponding multi-channel electrical signal transferred over the electrical connector.

29. A communication cable as defined in claim 28 wherein the optical fiber cable further comprises a single cable extending between the housing ends.

30. A communication cable as defined in claim 29 wherein the optical fiber cable further comprises a single optical fiber that forms the sole connection between the housing ends.

* * * * *

UNITED STATES PATENT AND TRADEMARK OFFICE
CERTIFICATE OF CORRECTION

PATENT NO. : 7,494,287 B2
APPLICATION NO. : 11/854319
DATED : February 24, 2009
INVENTOR(S) : Wang et al.

It is certified that error appears in the above-identified patent and that said Letters Patent is hereby corrected as shown below:

In Claim 1, at Column 7, line 64, after the word "including" add --;--.

In Claim 1, at Column 8, line 7, after the word "unit" add --and to allow the cable to be connected or disconnected from the system unit--.

In Claim 1, at Column 8, line 10, after the word "converter" insert the following --that simultaneously transmits and receives at least four bits of differential data, said signal converter--.

In Claim 1, at Column 8, lines 10 to 12, after the word "channels," cancel the text beginning "each with a" to and ending "optical receiver".

In Claim 1, at Column 8, line 15, after the phrase "connector for" add --processing and--.

Signed and Sealed this

Twenty-third Day of June, 2009

JOHN DOLL
*Acting Director of the United States Patent and Trademark Office*